United States Patent Office 2,736,489
Patented Feb. 28, 1956

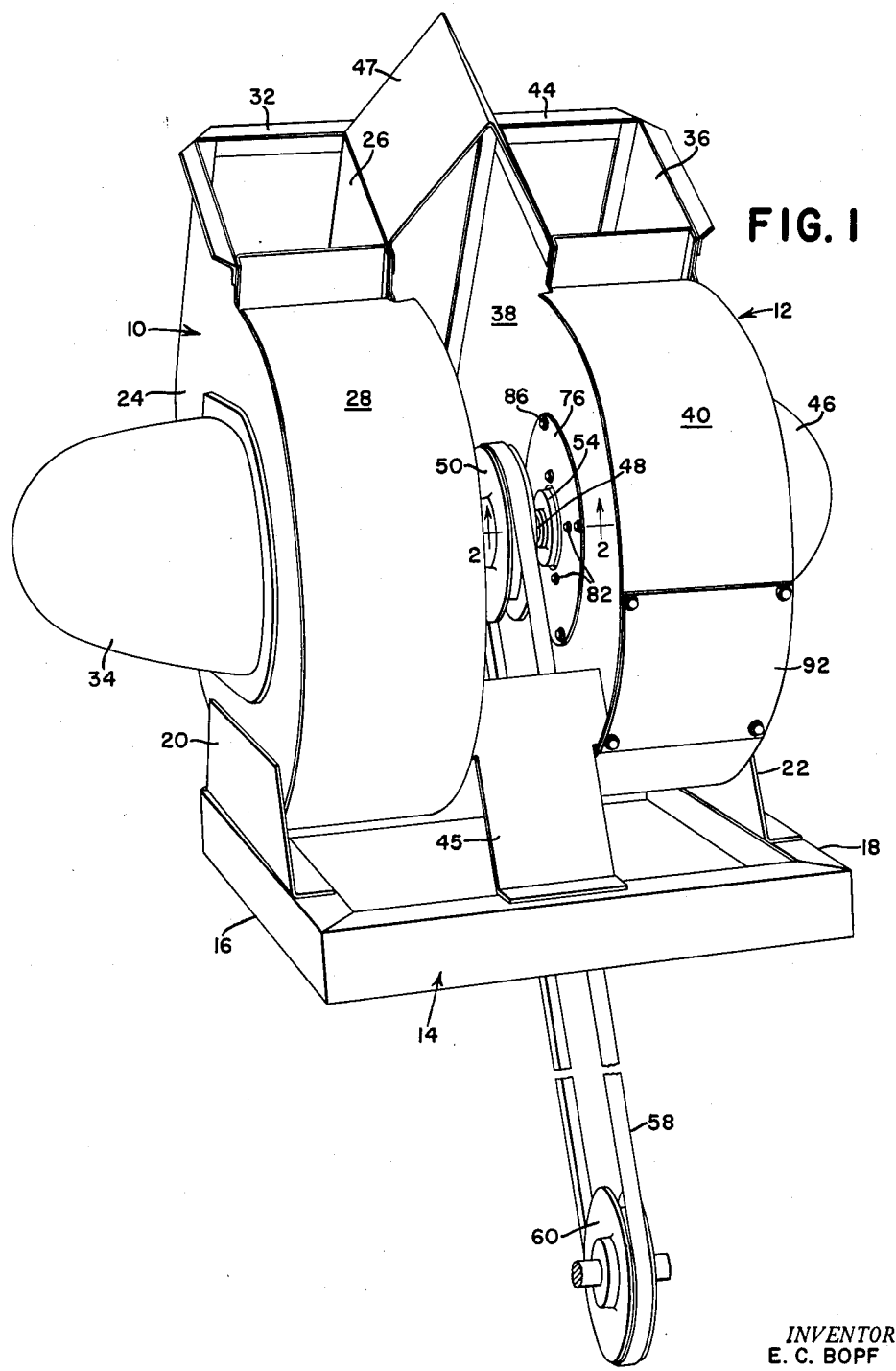

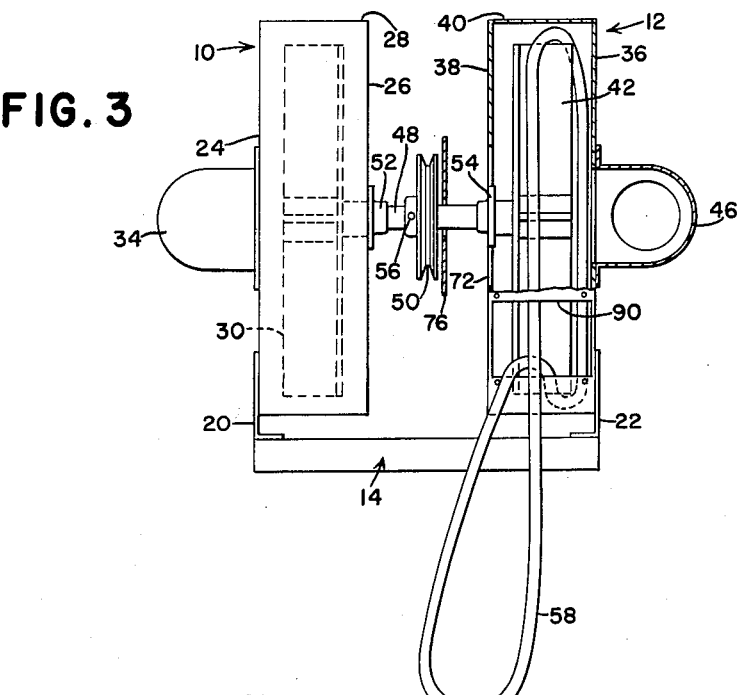
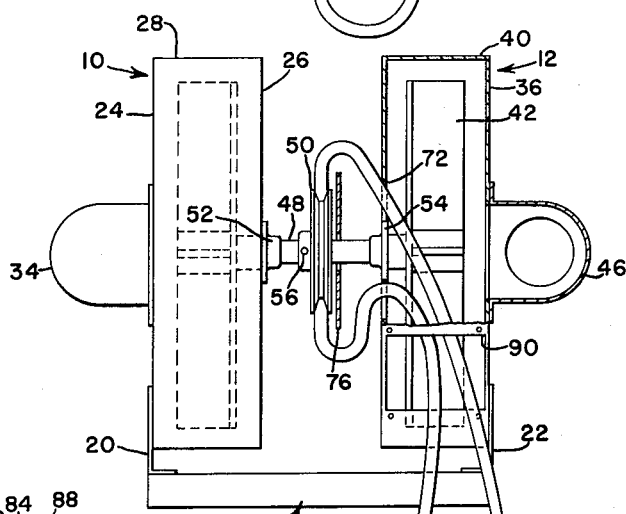
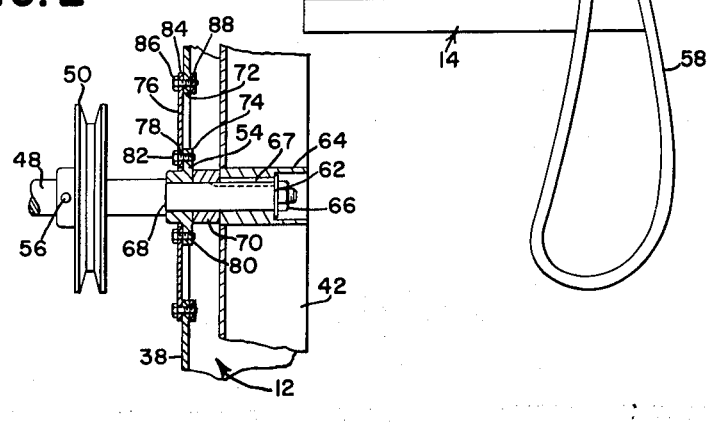

2,736,489

DUAL HOUSING AND SHAFT COUPLING ARRANGEMENT

Edward C. Bopf, Des Moines, Iowa, assignor to Deere Manufacturing Co., Dubuque, Iowa, a corporation of Iowa Application March 1, 1955, Serial No. 491,273

7 Claims. (Cl. 230—132)

This invention relates to a shaft coupling and more particularly to means utilizing a coupling and adjacent housing structure for affording convenient means for mounting a drive belt on a sheave associated with the coupling arrangement.

The present invention finds its greatest utility in an environment such as that presented by a mobile cotton picker of the type in which picked cotton is transferred from the picking mechanisms to a receptacle by means of a pneumatic conveyor system. That system ordinarily includes a pair of coaxially spaced apart blower fans and the rotors or fans are coaxially interconnected by a common shaft. A sheave located between the housings is connected by an endless drive belt to a power source on the machine. Because of associated structure, it has heretofore been impossible to remove the belt or to install a new belt without considerable dismantling of the associated structure. According to the present invention, this problem is solved by the provision of a novel bearing mounting including a removable filler plate so that the endless belt may be inserted through an access opening in one of the housings, passed axially over the rotor and out through the opening exposed by the removed filler plate, whereupon the loop of the belt may be trained about the sheave and the filler plate replaced to restore the arrangement to normal working condition.

It is therefore a primary object of the invention to provide an improved housing construction incorporating a removable filler plate providing an axially outwardly opening aperture in the housing through which a drive belt may be inserted. The invention further features the use of a solid shaft between the two fans or rotors, thereby avoiding the necessity of splitting the shaft.

The foregoing and other important objects and desirable features inherent in and accomplished by the present invention will become apparent as a preferred embodiment of the invention is disclosed in the following detailed description and accompanying sheets of drawings, the several figures of which will be described immediately below.

Fig. 1 is a perspective view showing the over-all dual housing arrangement.

Fig. 2 is a sectional view, on an enlarged scale, as seen generally along the line 2—2 of Fig. 1.

Figs. 3 and 4 illustrate successive stages in mounting of the drive belt.

The U. S. patent to Paradise 2,649,677 may be taken as representative of a mobile cotton picker in which the present invention finds its greatest utility. Although the patented disclosure is of a two-row machine and therefore including four fans or rotors, the adaptation of the present dual rotor design to a one-row machine will be readily appreciated.

The dual fan arrangement comprises first and second rotor housings 10 and 12 integrally mounted on a common support 14. The support 14 will ordinarily be carried on the frame of the mobile machine and is here shown as comprising a rectangular frame having first and second opposite side members 16 and 18 from which respectively rise supporting plates 20 and 22. The plates are secured respectively to the rotor housings 10 and 12 in any suitable manner.

The housing 10 comprises an outer radial wall 24, an inner radial wall 26 and a substantially peripheral or encircling wall 28 that establishes an annular or scroll-shaped space in conventional fashion about a rotor 30 within the housing. This space finds its discharge outlet in a tangential conduit 32. The numeral 34 designates an axial intake elbow, this elbow being connected to the picking mechanism of the cotton picker and providing an inlet for cotton and air, the cotton being discharged at 32 to any conventional receptacle (not shown).

The other rotor housing 12 is symmetrically constructed, having an outer radial wall 36, an inner radial wall 38 and a peripheral wall 40, the peripheral wall surrounding an encased rotor 42 and the housing having a tangential discharge duct 44. An intake elbow 46 leads axially to the interior of the housing via the outer radial wall 36.

The housings 10 and 12 are further integrated with the support 14 by means of connecting plates 45 and 47.

The rotors 30 and 42 are coaxially interconnected by a transverse solid shaft 48, and a belt-receiving sheave 50 is fixed to the shaft intermediate the housings 10 and 12. A first bearing 52 journals the shaft in the radial inner wall 26 of the housing 10 and a second bearing 54 similarly journals the shaft in the radial wall 38 of the housing 12. As will be appreciated, the sheave 50 is secured to the shaft 48 for rotation therewith and is held against axial displacement relative to the shaft, as by a pin 56. A drive belt 58 is trained about the sheave 50 and about a driving sheave 60, the sheave 60 representing a typical form of input or drive for the rotary means comprising the shaft 48, sheave 50 and rotors 30 and 42.

From the description thus far, it will be seen that the task of replacing the belt 58 could not normally be accomplished without considerable dismantling of the integrated support and housing structure. However, according to the present invention, this task is simplified by the provision of novel means for mounting at least the bearing 54, in connection with which reference is had to Fig. 2.

That figure shows that the shaft 48 extends into the rotor housing 12 to a terminal end 62 which is received within an integral hub 64 of the rotor 42. A nut 66 serves as means for securing the rotor hub to the terminal end 62 of the shaft. A drive key 67 holds the rotor on the shaft against relative rotation. The shaft 48 is shouldered at 68 to receive the bearing 54, whereby the bearing serves as a combined thrust and radial-load bearing. A spacer 70 is interposed between the bearing 54 and the rotor hub 64. Hence, the shaft 48 is held against axial displacement relative to the bearing 54 and rotor 42. The bearing 52 is similarly related to the shaft 48 in the other housing 10.

For all practical purposes, the rotor housing 10 may be considered a part of the support including the supporting frame 14. So considered, the shaft 48 extends from the support comprised by the housing 10 and enters the rotor housing 12 for connection to the rotor 42 in the manner just described. For the purpose of enabling mounting of the belt 58 on the sheave, without considerable dismantling of the housing or supporting structure, the radial inner wall 38 of the housing 12 has formed therein a circular opening 72 of a diameter considerably larger than that of a mounting flange 74 on the bearing 54. Filler means in the form of a filler plate or ring 76 is utilized to mount the bearing 54 concentrically within the opening 72. The ring 76 has its inner peripheral portion provided with a plurality of apertures 78, uniformly circumferentially or angularly spaced to register with a like plurality of tapped bores 80 in the bearing flange 74. Removable securing means or fasteners in the form of cap screws 82 cooperate with the apertures and tapped bores to releasably secure the filler plate 76 to the bearing 54.

The outer peripheral portion of the ring 76 has a plurality of circumferentially spaced bores 84 through which are passed cap screws 86 to be received by registering tapped bores 88 formed in the marginal portion of the radial wall 38 that defines the opening 72. When the cap screws are in place, the bearing 54 is rigidly mounted in the radial wall 38. However, as will presently appear, the filler plate 76 may be removed without disturbing the bearing 54 which, as previously described, is non-axially shiftable on the shaft 48.

The housing 12 has an access opening 90, preferably formed in the peripheral wall 40 and normally closed by a cover 92 (Fig. 1).

Figs. 3 and 4 show the manner of mounting the belt 58. The belt is first reduced to a small enough loop to permit its insertion through the uncovered access opening 90, after which the loop is radially expanded so that it will pass between the outer radial face of the rotor 42 and the inner surface of the outer radial wall 36, it being noted that the terminal end 62 of the shaft 58 is short of the radial wall 36, being axially inwardly of the radial plane including the outer radial face of the rotor 42. Likewise, the annular or scroll-shaped space about the rotor permits passage of the enlarged loop axially toward the inner radial wall 38. The loop is thereupon reduced and is passed through the radial wall opening 72 after the plate 76 has been removed so as to slide axially toward the sheave 50. The loop will, of course, have been reduced to permit its passage through the opening 72 and this looped portion may then be enlarged sufficiently to pass axially over the filler plate 76 for receipt by the sheave 50.

The remainder of the belt is pulled through the openings 90 and 72 and is fed downwardly between the members of the supporting structure 14 for training about the input sheave 60. After this is accomplished, the cap screws 82 and 86 are used to re-mount the filler plate 76 so that the bearing 54 is again adequately supported in the radial wall 38 of the housing 12.

It will be seen from the foregoing that the method of mounting the belt 58 is relatively simple and involves only the removal and reinstallation of the filler plate 76 and cover 92, thus avoiding dismantling of material parts of the structure and permitting retention of the housings 10 and 12 on the support 14. Moreover, a solid shaft 48 may be used, thus avoiding the complications usually involved in the use of split shafts.

Various features of the invention not specifically enumerated herein will undoubtedly occur to those versed in the art, as will various modifications and alterations in the preferred embodiment of the invention disclosed, all of which may be achieved without a departure from the spirit and scope of the invention.

What is claimed is:

1. A blower fan or like structure, comprising: a transverse support; an upright first rotor housing rigid on the support; a transverse rotor shaft projecting from the housing to a free terminal end remote from the housing; a first bearing journaling the shaft in the housing and fixing the shaft against axial displacement; a rotor coaxially fixed to the terminal end of the shaft in axially spaced relation to the first housing; an upright second housing rigid on the support in coaxially spaced relation to the first housing and encasing the rotor, said second housing having an outer radial wall axially spaced from the proximate radial face of the rotor and the terminal end of the shaft, a peripheral wall circumferentially spacedly encircling the rotor, and an inner radial wall axially spaced inwardly from the other face of the rotor and axially spaced outwardly from the first housing so as to afford between the housings an axial space traversed by the rotor shaft; a sheave coaxially fixed to the shaft in said space and in interspaced relation to the housings; a second bearing rotatable on the shaft and fixed against axial displacement relative to the shaft, said second bearing being disposed proximate to the inner wall of the second housing; said inner wall having a central opening therein materially larger than the second bearing; filler means concentric with the second bearing between the sheave and second housing and having radially inner mounting portions removably secured to the sheave side of the second bearing and radially outer mounting portions removably secured to the sheave side of said inner wall about said opening, whereby said filler means is removable from said second bearing and inner wall to uncover said opening; an endless drive belt for the sheave; and one of the walls of the second housing having therein an access opening in addition to the inner wall opening so that the belt in insertable within the second housing through said access opening to be passed between the outer wall and rotor for looping over the rotor so as to be movable axially toward the inner wall and out through the inner wall opening and axially past the second bearing for looping about the sheave.

2. The invention defined in claim 1, in which: the access opening is provided in the peripheral wall of the second housing.

3. The invention defined in claim 1, in which: the inner wall opening is circular and the filler means is a ring concentrically encircling the second bearing and having an outer peripheral edge portion and an inner peripheral edge portion respectively affording said outer and inner mounting portions.

4. The invention defined in claim 3, in which: the second bearing has a radial flange provided with circumferentially spaced axial tapped bores, the portion of said inner wall bordering said inner wall opening has circumferentially spaced axial tapped bores, the outer and inner peripheral edge portions of the filler ring respectively have axial bores radially and circumferentially spaced respectively on the order of and for respective register with the wall and bearing bores; and a plurality of threaded fasteners are received in the respective registered bores, said fasteners having tool-receiving portions exposed in the space between the housing and being axially removable in the direction toward the sheave.

5. A blower fan or like structure, comprising: a support having a transverse portion and an upright portion rigid thereon; a transverse rotor shaft projecting from the upright portion to a free terminal end remote from said upright portion; a first bearing journaling the shaft in the upright portion and fixing the shaft against axial displacement; a rotor coaxially fixed to the terminal end of the shaft in axially spaced relation to the upright portion; an upright housing rigid on the support in axially spaced relation to the upright portion and encasing the rotor, said housing having an outer radial wall axially spaced from the proximate radial face of the rotor and the terminal end of the shaft, a peripheral wall circumferentially spacedly encircling the rotor, and an inner radial wall axially spaced inwardly from the other face of the rotor and axially spaced outwardly from the upright portion so as to afford between the housing and said upright portion an axial space traversed by the rotor shaft; a sheave coaxially fixed to the shaft in said space and in interspaced relation to the housing and upright portion; a second bearing rotatable on the shaft and fixed against axial displacement relative to the shaft, said second bearing being disposed proximate to the inner wall of the housing; said inner wall having a central opening therein materially larger than the second bearing; filler means concentric with the second bearing between the sheave and housing and having radially inner mounting portions removably secured to the sheave side of the second bearing and radially outer mounting portions removably secured to the sheave side of said inner wall about said opening, whereby said filler means is removable from said second bearing and inner wall to uncover said opening; an endless drive belt for the sheave; and one of the walls of the housing having therein an access opening in addition to the inner wall opening so that the belt is insertable within the housing through said access opening to be passed between the outer wall and rotor for looping over the rotor so as to be movable axially toward the inner wall and out through the inner wall opening and axially past the second bearing for looping about the sheave.

6. The invention defined in claim 5, in which: the inner wall opening is circular and the filler means is a ring concentrically encircling the second bearing and having an outer peripheral edge portion and an inner peripheral edge portion respectively affording said outer and inner mounting portions.

7. A blower fan or like structure, comprising: a support having a transverse portion and an upright portion rigid thereon; a transverse rotor shaft projecting from the upright portion to a free terminal end remote from said upright portion; a first bearing journaling the shaft in the upright portion and fixing the shaft against axial displacement; a rotor coaxially fixed to the terminal end of the shaft in axially spaced relation to the upright portion; an upright housing rigid on the support in axially spaced relation to the upright portion and encasing the rotor, said housing having an outer radial wall axially spaced from the proximate radial face of the rotor and the terminal end of the shaft, a peripheral wall circumferentially spacedly encircling the rotor, and an inner radial wall axially spaced inwardly from the other face of the rotor and axially spaced outwardly from the upright portion so as to afford between the housing and said upright portion an axial space traversed by the rotor shaft; a sheave coaxially fixed to the shaft in said space and in interspaced relation to the housing and upright portion; a second bearing rotatable on the shaft and fixed against axial displacement relative to the shaft, said second bearing being disposed proximate to the inner wall of the housing; said inner wall having a central opening therein materially larger than the second bearing; filler means concentric with the second bearing between the sheave and housing and having radially inner mounting portions removably secured to the sheave side of the second bearing and radially outer mounting portions removably secured to the sheave side of said inner wall about said opening, whereby said filler means is removable from said second bearing and inner wall to uncover said opening; and one of the walls of the housing having therein an endless-belt-receiving access opening in addition to the inner wall opening.

No references cited.